United States Patent
Skoyles et al.

[11] 3,993,363
[45] Nov. 23, 1976

[54] ANTI-LOCK VEHICLE BRAKE SYSTEMS

[75] Inventors: Derek Robert Skoyles; Denis Sharp, both of East Grinstead, England

[73] Assignee: U.S. Philips Corporation, New York, N.Y.

[22] Filed: Apr. 21, 1975

[21] Appl. No.: 569,978

[30] Foreign Application Priority Data
May 2, 1974 United Kingdom............... 19310/74

[52] U.S. Cl. .......................... 303/21 P; 303/21 BE; 303/21 B
[51] Int. Cl.² ......................................... B60T 8/02
[58] Field of Search ............... 188/181; 303/20, 21, 303/106, 109, 110; 307/10 R; 317/5; 324/161–162; 340/53, 62

[56] References Cited
UNITED STATES PATENTS

| | | | |
|---|---|---|---|
| 3,635,530 | 1/1972 | Packer et al. ..................... | 303/21 P |
| 3,825,305 | 7/1974 | Kasselmann et al. ........... | 303/21 BE |
| 3,854,779 | 12/1974 | Skoyles et al. .................... | 303/21 P |

Primary Examiner—Stephen G. Kunin
Attorney, Agent, or Firm—Frank R. Trifari

[57] ABSTRACT

An electronic control circuit for an anti-lock vehicle brake system which includes apparatus responsive to an input signal having a quantity which is a function of wheel speed to produce an output signal for causing energization of a solenoid valve when the quantity undergoes a change corresponding to a change in wheel speed at a rate in excess of a first predetermined rate of change of wheel speed and by an amount which is greater by a given percentage than its amount of change would have been had its change of wheel speed continued at said first predetermined rate of change. The latter corresponds to a reference rate of wheel deceleration. Other apparatus responsive to the input signal when the output signal is produced to store an initial reference velocity signal that has a predetermined relationship with the actual wheel speed to which the value of the quantity then existing corresponds. Other apparatus is responsive after a predetermined period for producing a generated signal following the initial storage of the reference velocity signal. The generated signal corresponds initially to the reference velocity signal but then decreases at a second predetermined rate of change of wheel speed greater than the first reference rate of wheel speed and for a variable period whose duration is a function of the initially stored reference velocity. This apparatus is responsive following the variable period for then increasing the generated signal at a third predetermined rate of change of wheel speed until it attains a predetermined value having a given relationship with the initially stored reference velocity. This apparatus is also responsive following the attainment of the predetermined value by the generated signal to decrease the latter at a fourth predetermined rate of change of wheel speed. Additional apparatus is responsive to the input signal for terminating the output signal to cause solenoid de-energization whenever the quantity assumes a value corresponding to a wheel speed having a given relationship with the prevailing value of the generated signal.

14 Claims, 7 Drawing Figures

ANTI-LOCK VEHICLE BRAKE SYSTEMS

This invention relates to anti-lock brake systems for wheeled vehicles, that is, brake systems including means for improving braking performance of a vehicle by causing a decrease of the braking force applied to a road wheel of the vehicle if the wheel tends to lock, in a circumstance likely to produce an incipient skid condition, following brake application, said means then causing the braking force to be increased again without the need for any change in the actual braking action (by a person using the brake) causing the brake application. Such brake systems can be suuccessful in the reducing the risk of skidding due to wheel lock and in maintaining directional control during braking, and can also reduce braking distances.

When a braking force is applied to a road wheel to reduce vehicle speed, a certain percentage slip is introduced, that is the braked wheel tends to rotate more slowly than the free rolling speed that should obtain for the prevailing vehicle speed, due to the adhesion force between tire and road. As the braking force is increased, this adhesion force increases, accompanied by an increase in the percentage slip, until this adhesion force reaches a maximum at an optimum slip (which typically is 10% to 20%), after which the adhesion force decreases with further increase of braking force and the percentage slip increases to 100% at which the braked wheel becomes locked.

FIG. 1 of the accompanying drawings illustrates diagrammatically typical force/slip curves for road surfaces affording different co-efficients of friction ($\mu$) to a vehicle wheel. These curves are plotted as adhesion force F against percentage wheel slip %WS. At 0%WS a wheel is free rolling, whereas at 100%WS it is locked. The force/slip curve 2 is for a typical high ($\mu$) surface (e.g. $\mu=1$), the force/slip curve 2 is for a typical intermediate ($\mu$) surface (e.g. $\mu=0.5$), and the force/slip curve 3 is for a typical low ($\mu$) surface (e.g. $\mu=0.1$).

The aim of an anti-lock vehicle brake system in respect of each road wheel controlled by it, is to anticipate wheel locking before it actually occurs and to control the braking force such that the wheel is kept turning in the region of maximum adhesion force between tire and road, that is, in the region where the optimum percentage slip occurs.

Many anti-lock vehicle brake systems have been proposed; some simple and others complex. Those operating on rear wheels only of a vehicle are usually simple and this is admissible partly because weight transfer to the front wheels during braking makes rear wheel braking less important, and partly because the extra inertia of the vehicle transmission (in the case of rear wheel drive) can assist the anti-lock braking control action. A simple system is rarely adequate when operating on front wheels of a vehicle because, in this case, the anti-lock braking control action has to be very accurate in order to achieve, on a high ($\mu$) surface, vehicle stopping distances that are comparable with locked wheel stopping distances without any anti-lock braking control action. Thus a complex system is usually necessary in this case and also in the case where the system operates on each road wheel of a vehicle.

Some anti-lock vehicle brake systems which have been proposed are wholly mechanical and use an inertia sensor for detecting when wheel locking is imminent due to an excessive braking force. Upon detecting such a condition the inertia sensor acts to reduce the braking force, for instance by opening a relief valve to reduce fluid pressure which is producing the braking force. Other anti-lock vehicle brake systems use an electronic control circuit for detecting when wheel locking is imminent due to an excessive braking force, together with a solenoid valve which is actuable by the control circuit to reduce fluid pressure at the brake. It is with these latter anti-lock vehicle brake systems that the present invention is particularly concerned.

According to the present invention there is provided for an anti-lock vehicle brake system an electronic control circuit comprising, means responsive to an input signal having a quantity which is a function of wheel speed to produce an output for causing energisation of a solenoid (valve) when said quantity undergoes a change corresponding to a change in wheel speed at a rate in excess of a first predetermined rate of change and by an amount which is greater by a given percentage than its amount of change would have had its change continued at said first predetermined rate of change, the latter corresponding to a reference rate of wheel deceleration, means also responsive to said input signal when said output is produced to store an initial reference velocity that has a given relationship with the actual wheel speed to which the value of said quantity then obtaining corresponds, means responsive after a predetermined period for decreasing the stored reference velocity at a second predetermined rate of change greater than said first and for a variable period whose duration is a function of the initially stored reference velocity, means responsive following said variable period for increasing the stored reference velocity at a third predetermined rate of change until it attains a certain velocity having a given relationship with the initially stored reference velocity, means responsive following the attainment of said certain velocity by the stored reference velocity to decrease the latter at a fourth predetermined rate of change, and means responsive to said input signal for terminating said output (to cause solenoid de-energisation) wherever said quantity assumes a value corresponding to a wheel speed having a given relationship with the prevailing stored reference velocity.

In carrying out the invention; said initial reference velocity may correspond substantially to the actual wheel speed that obtains when said output is produced; said certain velocity may be the velocity that the initially stored reference velocity would have attained had the latter been decreasing at said first predetermined rate of change from its instant of storage; said fourth predetermined rate of change may be substantially the same as said first predetermined rate of change; and said output may be terminated when said quantity assumes a value corresponding to a wheel speed which is substantially the same as the prevailing stored reference velocity. Also, the final decrease of the stored reference velocity at said fourth predetermined rate of change may be effected after a predetermined delay during which the stored reference velocity is held at said certain velocity.

The selection of the different rates of change of the stored reference velocity and of the durations of the various periods for which these rates of change persist, would have regard not only to the operating characteristics of an anti-lock vehicle brake system for which a control circuit according to the invention is provided but also to the braking and inertial characteristics of a vehicle to which such a system is applied. For instance, the rates of change would be higher and the durations shorter for motor cars than for heavy lorries.

With a suitably designed control circuit according to the invention, it is expected that for a high ($\mu$) road surface the termination of said output will occur during said variable period, because a wheel at which the braking force has been reduced will recover quickly (from its tendency to decelerate to a locked condition) on such a road surface. Thus in this instance, the solenoid valve will be held energised for a duration which at the most can extend up to the end of said variable period. For a low ($\mu$) road surface, the wheel can take so long to recover that the termination of said output will occur after said variable period when the stored reference velocity is increasing at said third predetermined rate of change or even later still when the stored reference velocity is decreasing at said first predetermined rate of change. For an appreciation of the foregoing it is to be understood that when the wheel speed initially changes by said given percentage at a rate in excess of the first predetermined rate of change the wheel continues to decelerate to a much lower wheel speed than that which is stored as the initial velocity reference, before it starts to recover, this being due to the solenoid energisation time and the inherent inertial delay in an anti-lock vehicle brake system before the braking force is actually reduced.

The response by the control circuit to said input signal quantity can provide, in effect, a means of wheel slip detection. Thus, if said reference rate of wheel deceleration is chosen in relation to an estimated maximum available vehicle deceleration that a vehicle, for which an anti-lock vehicle brake system embodying the control circuit is intended, can achieve on braking without wheel locking, and said given percentage change in wheel speed is chosen in relation to the optimum percentage slip range, then the control circuit response will occur when the wheel is rotating more slowly (by the given percentage change) than the free rolling speed that should obtain for the prevailing vehicle speed with the vehicle decelerating at the estimated maximum available value. For example, if the estimated maximum available value of vehicle deceleration is 1g, then said reference rate of wheel deceleration may be 1.5g, allowing for a safety factor. Because of this safety factor, said given percentage change may be smaller than the optimum percentage slip range, (unless wheel deceleration is very much greater than said reference rate) since a measure of slip is already introduced by the safety factor. Thus, said given percentage change may be within the rate range 7% to 10%.

Suitably, the input signal to an electronic control circuit according to the invention is derived from a train of pulses produced by a transducer which is so arranged that the frequency of the pulse train is a function of (e.g. proportional to) the speed of rotation of a wheel to be controlled by an anti-lock vehicle brake system embodying the circuit. Alternatively, the derived input signal can be a d.c. signal the amplitude of which varies with increase in wheel speed as a natural log. function.

In order that the invention may be more fully understood reference will now be made by way of example to the accompanying drawings, of which:

Figure 1:
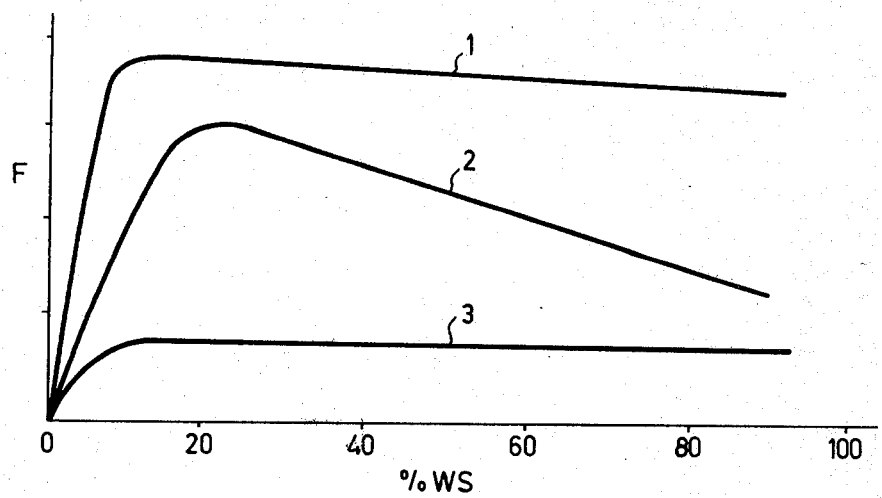
FIG. 1 shows, as aforesaid, typical force/slip curves.
Figure 2:
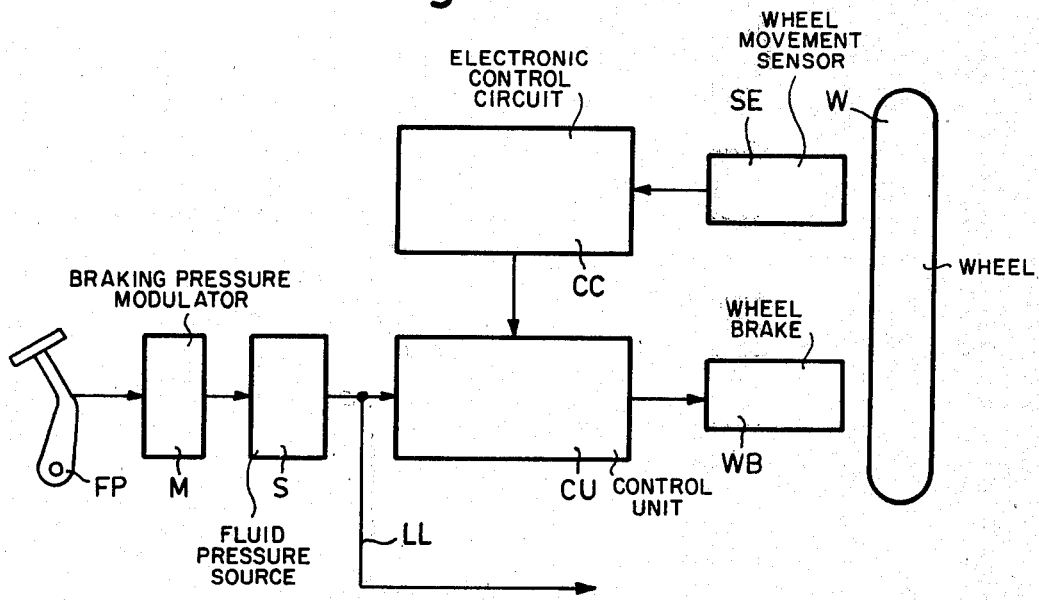
FIG. 2 is a diagrammatic general layout for an anti-lock vehicle brake system.

Referring to the drawings, the general layout for an anti-lock vehicle brake system shown in FIG. 2 shows a brake pedal FP for actuating a braking pressure modulator M which controls the application of fluid pressure from a fluid pressure source S of the system to a wheel brake WB. An anti-lock control unit CU is provided between the fluid pressure source S and the brake WB. A wheel movement sensor SE supplied an electrical signal related to rotational movement of a wheel W, for which the brake WB is provided, to an electronic control circuit CC. This electrical signal can be so derived directly by the sensor SE as to vary as a function of rate of change of wheel speed, or the electrical signal can be so derived (e.g. as a train of pulses) as to be proportional to wheel speed and converted by an input stage of the electronic control circuit to an effective input signal which varies in proportion to or as another function of rate of change of wheel speed. The anti-lock control unit CU would include a solenoid valve which is energised by an electrical output from the electronic control circuit CC to cause braking force applied to the wheel brake WB to be reduced. In the present instance, the control circuit CC is assumed to be in accordance with the invention, and its further operation to terminate the anti-lock braking control action will be dealt with presently.

As indicated by the lead LL, separate systems as shown in FIG. 2 (with a common fluid pressure source) can be provided in respect of each road wheel of a vehicle, but it would also be possible to provide a single system for two (rear) wheels driven by a vehicle transmission shaft witth a sensor associated with the shaft for producing the electrical signal related to wheel rotational movement. As another alternative, a single anti-lock control unit with its solenoid valve may be provided in common for all the road wheels of a vehicle. In this case, each road wheel would have its own wheel movement sensor and associated electronic control circuit, and any of the latter would provide an electrical output to energise the solenoid valve when the appertaining wheel tends towards a locked condition.

Figure 3:
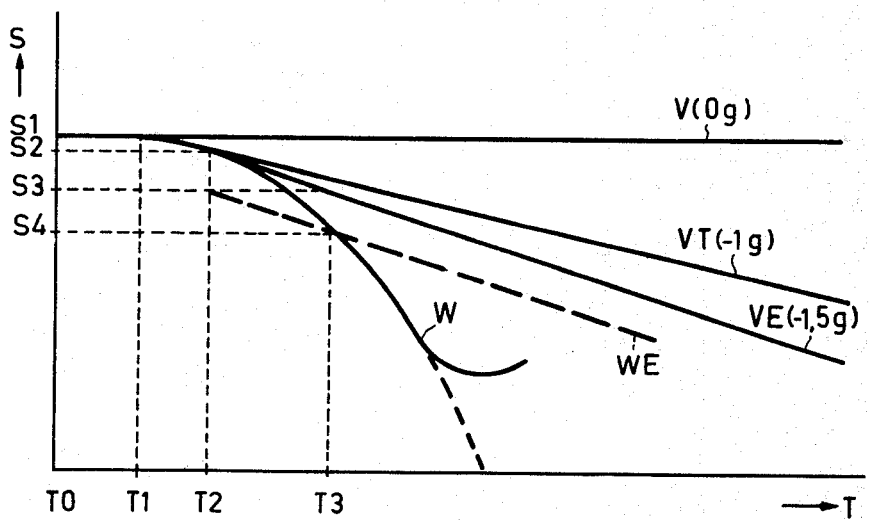
FIG. 3 shows diagrammatically "wheel-slip" detection for the first cycle of an anti-lock control action.

Turning now to FIG. 3, this figure shows on a graph of speed S against time T a straight line V which represent a constant vehicle speed S1 (i.e. Og) a straight line VT the slope of which represents the vehicle speed which experiences a theoretical maximum vehicle deceleration (e.g. −1g) that a vehicle for which an anti-lock vehicle brake system is intended can achieve on braking without wheel locking, a straight line VE which represents an estimated vehicle speed with a deceleration of (e.g. −1.5g) which is greater than the theoretical maximum vehicle deceleration by a safety factor, a broken line straight line curve WE which represents an estimated wheel speed for optimum percentage slip relative to the estimated vehicle speed VE, and a curve W which represents actual wheel speed.

Before a braking force is applied to the wheel the actual vehicle speed S1 equals the wheel speed over the period T0 to T1. Assuming that a braking force is applied at time T1, the wheel will decelerate until at time T2 and at a speed S2 it will have exceeded the estimated vehicle deceleration reflected by the curve VE. At time T3 the wheel will have fallen to a speed S4 which is below the estimated vehicle speed S3 at time T3 by a percentage slip which may be of the order of 7% to 10%. As will be described, the control circuit produces its output for solenoid energisation at time T3. After solenoid energisation wheel speed continues to fall for a time until the braking force is reduced sufficiently for the wheel to start to recover.

Figure 4:
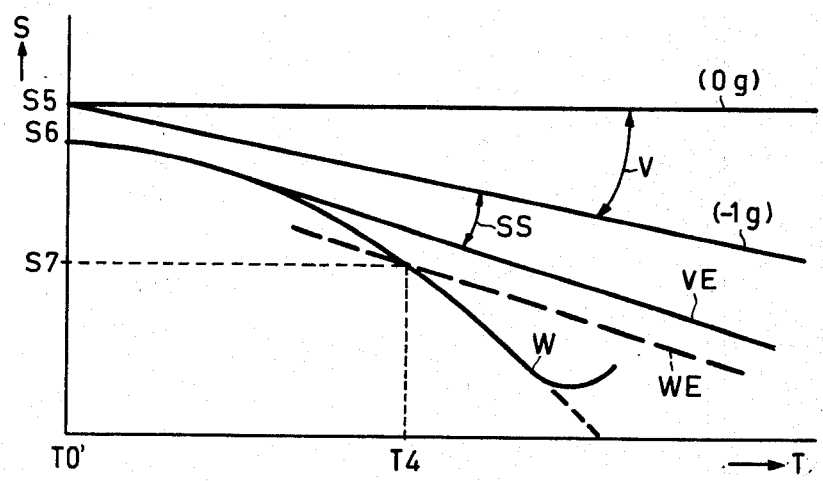
FIG. 4 shows diagrammatically "wheel slip" detection for subsequent cycles of an anti-lock control action.

Once the wheel has recovered speed sufficiently, as will be described, the braking force is re-applied to the wheel. Turning now to FIG. 4, which is also a graph of speed S against time T, after the recovery of the wheel to a speed whithin 8% of the speed of the vehicle, the vehicle at time T0' may have a speed S5 and any deceleration V between (0g) and (−1g). The wheel has only a speed S6 at time T0' because it is not allowed to recover to vehicle speed. Therefore, for subsequent anti-lock control cycles, estimated speeds start from an initial percentage slip rather than zero slip. SS represents this initial percentage slip at any speed. Thus, when the output for solenoid energisation is next produced at time T4, the wheel has a speed S7 and thus a percentage slip greater than 7% to 10% by the percentage slip SS. It is estimated that the total slip will be in the 10% to 20% optimum percentage slip range.

Figure 5:
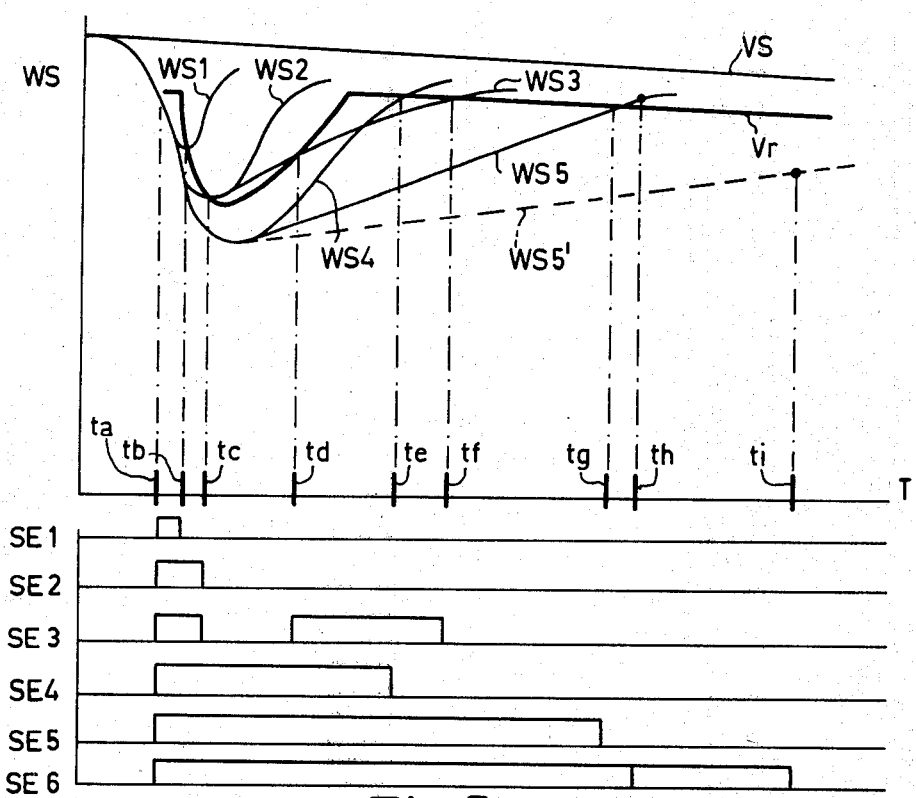
FIG. 5 shows diagrammatically periods of solenoid energisation as determined by a control circuit according to the invention.
Figure 6:
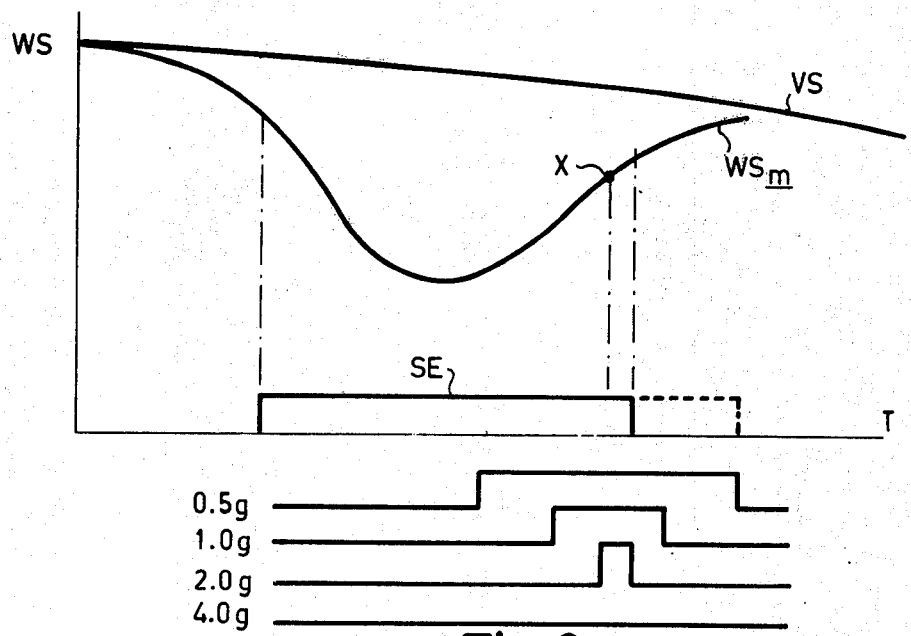
FIG. 6 shows a modified control function of the control circuit.
Figure 7:
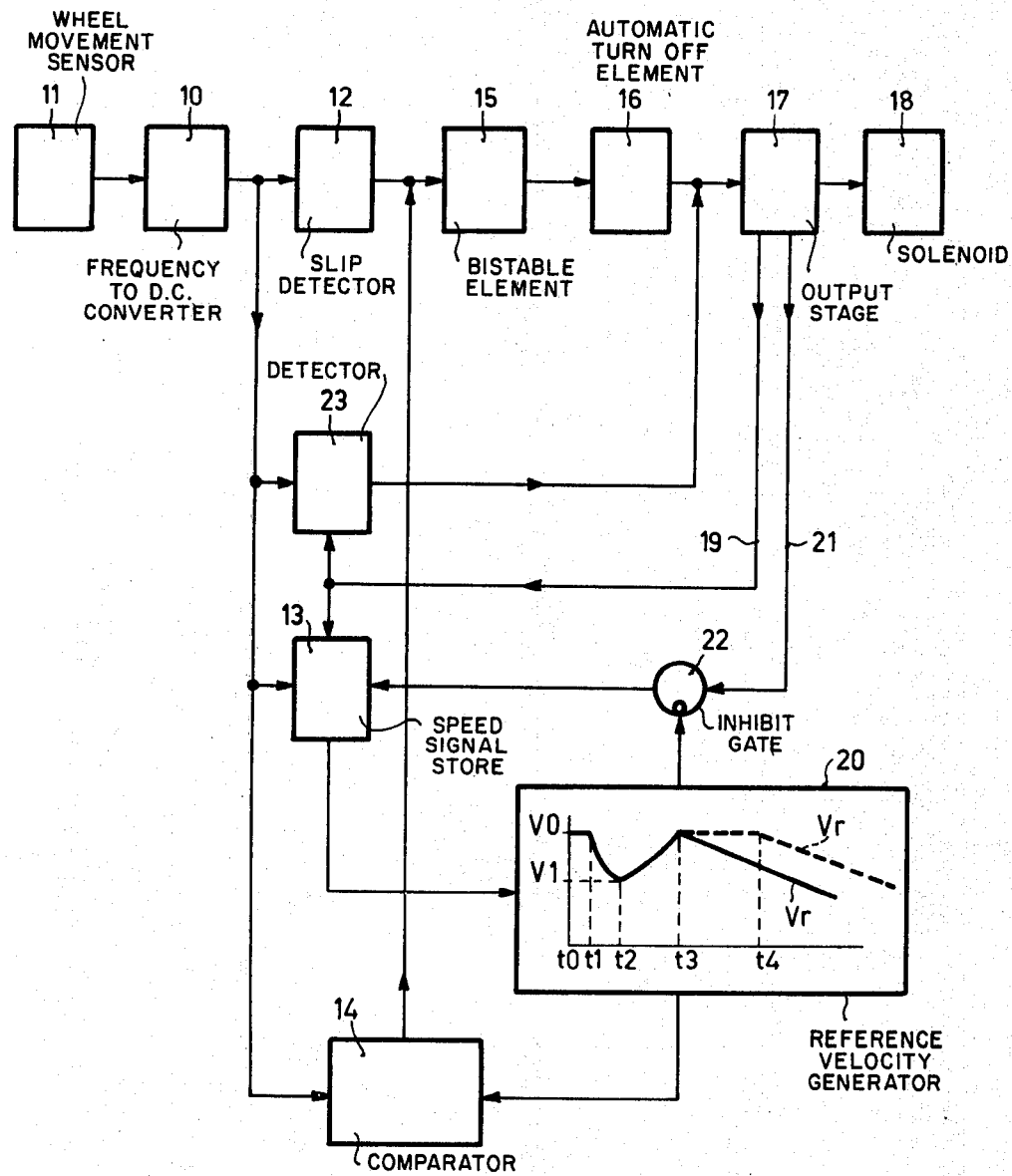
FIG. 7 shows a block diagram of a control circuit according to the invention.

Referring now to FIGS. 5, 6 and 7 the block diagram of a control circuit according to the invention shown in FIG. 7 comprises a frequency-to-d.c. convertor 10 for receiving from a wheel movement sensor 11 pulses of frequency proportional to speed of rotation of a wheel. The output from the convertor 10 is a d.c. signal having a magnitude which is a function of the input pulse frequency. This d.c. signal is applied to a slip detector 12, to a speed signal store 13 and to a comparator 14. When the rate of change of the magnitude of the d.c. signal from the convertor 10 exceeds a reference rate of wheel deceleration and also undergoes a change in magnitude, such as to signify a given percentage of wheel slip, as aforesaid, an output from the slip detector 12 initiates an anti-lock control action by setting a bistable element 15 which produces, via an automatic turn-off element 16, an output or output signal which turns-on an output stage 17 for energising a solenoid 18. When the output stage 17 is turned-on, an output therefrom is applied over an "ON" lead 19 to the store 13 which is operable in response thereto to store the prevailing magnitude of the d.c. signal applied to it from the convertor 10. A reference velocity generator 20 is responsive to an output produced by the store 13 on operation thereof to commence the generation of a reference velocity curve Vr from a velocity level Vo which corresponds to the magnitude of the d.c. signal stored in the store 13. The nature of the reference velocity generator 20 will vary with the particular function that is required. An example of such apparatus is shown in U.S. Pat. No. 3,870,160. FIG. 6 of this patent shows how several different voltages may be summated to produce a desired reference curve. The reference curve Vr may be generated by using several summated voltages. In another form of the invention a first voltage corresponding to the curve RS shown in FIG. 15 of U.S. Pat. No. 3,854,779 and generated by the circuit of FIG. 14 may have added to it a second voltage which decreases exponentially followed by a third voltage which increases exponentially with each of the two exponential voltages being produced by a Miller circuit as described in U.S. application Ser. No. 574,615, filed May 5, 1975 which was a continuation of U.S. application Ser. No. 368,953, filed June 11, 1973. This reference velocity curve Vr starts at a time $t0$ and the initial velocity level Vo is held for a short period until a time $t1$ after which the reference velocity curve Vr decreases exponentially to a level V1 during a period $t1$ to $t2$ which is proportional to the initial velocity level Vo. After the time $t2$, the reference velocity curve Vr increases substantially linearly until at a time $t3$ it reaches the initial velocity level Vo again. After the time $t3$, the reference velocity curve Vr decreases at the same rate as the reference rate value of wheel deceleration.

The rates of change and other parameters chosen for the reference velocity curve Vr would be based on measurements of actual wheel speeds for both good and slippery surfaces when using anti-lock control. For example, calculation and experimentation has indicated that in an optimum reference velocity curve the delay period $t0$ to $t1$ can be approximately 10ms., the rate of change during the period $t1$ to $t2$ can be such that the reference velocity level falls exponentially to a level of approximately 0.76 of the initial velocity level Vo after 15ms. at a vehicle speed of 45ft. per sec., the rate of change during the period $t2$ to $t3$ can be equivalent to an acceleration of approximately 4g., and the rate of change after time $t3$ can be equivalent to a deceleration of approximately 1.5g. It is also concluded as a result of calculation and experimentation that the rate of change during the period $t1$ to $t2$ could be other than exponential, for instance, substantially linear, and that the rate of change during the period $t2$ to $t3$ could be other than substantially linear, for instance, exponential. Also, the initial velocity level Vo could correspond to a fraction of the magnitude of the d.c. signal stored in the store 13; the velocity level attained after the period $t2$ to $t3$ could be greater or less than the initial velocity level Vo; and the final rate of change after the time $t3$ could be equivalent to a deceleration which is greater or less than the reference rate of wheel deceleration. A further modification of the reference velocity curve Vr is (as indicated in dotted line) for the velocity level attained at time $t3$ to be held constant for a period $t3$ to $t4$, which may be proportional to the initial velocity level Vo, before the decrease of the curve at the final rate of change.

The reference velocity generator 20 applies to the comparator 14 a reference signal which varies in magnitude in correspondence with the instantaneous level of the reference velocity curve Vr. The comparator 14 produces an output whenever the magnitude of the d.c. signal from the convertor 10 is the same as that of the reference signal (or has some other pre-determined relationship with it). The output from the comparator 14 resets the bistable element 15 to turn-off the output stage 17 (by re-setting the automatic turn-off element 16) so that the solenoid 18 is de-energised. When the output stage 17 turns-off, an output is applied therefrom over an "OFF" lead 21 to attempt to reset the store 13, but the store 13 cannot in fact be reset until the end of the period $t1$ to $t3$ of the reference velocity curve Vr due to an inhibiting output applied during this period from the reference velocity generator 20 to an inhibit gate 22 connected in the lead 21. Hence, if during the period t1 to t3 the magnitude of the reference signal and the d.c. signal from the convertor 10 become the same again, another output produced by the comparator 14 this time sets the bistable element 15 again to turn-on again the output stage 17 and thus re-energise the solenoid 18 for a further period. The next output from the comparator 14 will occur after the period t1 to t3 so that when as a result of this next output the bistable element 15 is reset again to turn-off the output stage 17 to affect solenoid de-energisation, the output on "OFF" lead 21 from the stage 17 can reset the store 13 which in turn resets the reference velocity generator 20 to terminate the anti-lock control action initiated by the slip detector 12.

If the above described circuit operations to effect solenoid de-energisation are not achieved after a predetermined period (e.g. 0.5 secs.) due to non-correspondence in the respective magnitudes of the d.c. signal from the convertor 10 and the reference signal, then the automatic turn-off element 16 becomes responsive to turn-off the output stage 17 to effect solenoid de-energisation.

The control circuit may also include a low acceleration detector 23 which operates independently of the reference velocity generator 20 and comparator 14 to maintain the output stage 17 turned-on (to hold the solenoid 18 energised) if the wheel is accelerating only slowly when it reaches a velocity at which solenoid de-energisation would otherwise be effected due to the action of the generator 20 and comparator 14. Solenoid energisation can be prolonged by the detector 23 until either a predetermined acceleration is reached or the prevailing wheel acceleration falls to a lower predetermined value.

FIGS. 5 and 66 show diagrammatically the circuit response. In FIG. 5 five different wheel speed signals WS1 to WS5 are shown on a graph of wheel speed WS (d.c. magnitude) against time T relative to the reference velocity curve Vr, together with corresponding periods of solenoid energisation SE1 to SE5. A curve VS represents vehicle speed. For each of the wheel speed signals WS1 to WS5 solenoid energisation is effected at time ta by operation or the slip detector (12 - FIG. 7) as previously mentioned. The wheel speed signal WS1 is in respect of a high μ surface so that the wheel quickly recovers and at time tb the signal WS1 meets the reference curve Vr and solenoid de-energisation is effected after the period ta to tb. The wheel speed signal WS2 is in respect of a medium μ surface so that the wheel takes a little longer to recover and the signal WS2 does not meet the reference curve Vr until time tc after a slightly longer solenoid energisation period ta to tc. With regard to the wheel speed signal WS3, this corresponds to the signal WS2 to effect solenoid energisation for the period ta to tc, but thereafter the wheel recovers at only a slow rate towards the free rolling speed so that the signal WS3 meets the reference curve Vr again at the time td, and further energisation of the solenoid is effected because the time td is within the period (t1 - t3 - FIG. 7) of the reference curve Vr during which resetting of the control circuit is inhibiited. The signal WS3 meets the reference curve Vr again at time tf and solenoid de-energisation is effected after a second period td to tf. The wheel speed signals WS4 and WS5 are in respect of low μ and very low μ surfaces, respectively, for which solenoid energisation is effected for the periods ta to te and ta to tg, respectively. From the foregoing, it can be seen that following slip detection, there is always solenoid energisation when the wheel speed signal is "below" the reference velocity curve Vr. The effect of the low acceleration detector (23 - FIG. 7) is shown in relation to the wheel speed signal WS5 only and, as illustrated in the solenoid energisation period SE6, this effect is to extend solenoid energisation until time th when the signal WS5 no longer exceeds a pre-set low acceleration reference of the detector 23. If, as indicated by the dotten line WS5' the signal WS5 had an even lower rate of recovery, then the solenoid energisation period would be extended only to the time ti (SE6) at which the automatic turn-off element (16 - FIG. 7) became effective.

As so far considered, the low acceleration detector 23 has only a single sensing level (e.g. of the order of 0.5g. for use mainly on very low μ surfaces (e.g. 0.14μ). In order to cater for intermediate surfaces (e.g. 0.2μ to 0.5μ), additional low acceleration detectors can be provided in parallel with the existing one. These additional acceleration detectors would have higher acceleration responses. The effect of this modification is illustrated in FIG. 6 which shows a curve VS representing vehicle speed and a curve WSm representing wheel speed in a graph of wheel speed WS against time T. Assuming four acceleration detectors having sensing levels of 0.5g., 1.0g, 2.0g., and 4.0., respectively then as the acceleration of the wheel increases these detectors sense in sequence. In FIG. 6, it is assumed that the wheel did not exceed 4.0g. so that the 4g. detector did not sense. As the wheel passes through its peak acceleration (i.e. at point X) the detectors turn-off in the same order as they turned-on. Since the solenoid energisation period SE would have been for a long time (i.e. until the end of the sensing by the 2g. detector), the braking force would be practically zero so that the acceleration of the wheel would be mainly a function of the road surface. The peak acceleration would therefore occur as the wheel passes through the peak of the force/slip characteristic.

It will be evident that a circuit realisation of the control circuit represented by the block diagram of FIG. 7 could be achieved in a number of different ways. For instance, the frequency-to-d.c. convertor 10 and slip detector 12 can be of the form described in co-pending U.S. application Ser. No. 574,615, filed May 5, 1975 which is a continuation of U.S. application Ser. No. 368,953, filed June 11, 1973, now abandoned. These two elements, together elements equivalent to the automatic turn-off element 16, the output stage 17 and the low acceleration detector 23 are also described in U.S. Pat. No. 3,854,779. The store 13 can be a capacitor store, the reference velocity generator can be realised in known manner using RC charge-discharge circuits, and the comparator 14, bistable element 15 and inhibit gate 22 can be of known form. The various time periods and rates of change, etc., referred to in the foregoing are in respect of a road wheel diameter of 2 feet having a transducer toothed ring rotatable therewith which has 60 teeth/revolution. A typical output voltage from the magnetic pick-up of the transducer would be 1 volt peak at 100c.p.s. (7 m.p.h.) and 10 volts peak at 1000 c.p.s. (approximately 70 m.p.h.).

With regard to the reference velocity curve Vr generated by the reference velocity generator 20, in the circuit realisation it is convenient to generate the equivalent of this curve by generating a first reference signal in which the level remains constant at V$o$ over the period $t1$ to $t3$, and a second reference signal which varies inversely as the variation in the reference velocity curve V$r$ over the period $t1$ to $t3$ is generated and summed with the wheel speed signal (that is, the d.c. signal from the convertor 10) to produce a modified wheel speed signal which is compared with the first reference signal in the comparator 14.

What we claim:

1. An electronic control circuit for an anti-lock vehicle brake system, said control circuit comprising, operating means responsive to an input signal having a quantity which is a function of wheel speed to produce an output signal for causing energisation of a solenoid valve when said quantity undergoes a change corresponding to a change in wheel speed at a rate in excess of a first predetermined rate of change of wheel speed and by an amount which is greater by a given percentage than its amount of change would have been had its change of wheel speed continued at said first predetermined rate of change, the latter corresponding to a reference rate of wheel deceleration, storage means also responsive to said input signal when said output signal is produced to store an initial reference velocity signal that has a predetermined relationship with the actual wheel speed to which the value of said quantity then obtaining corresponds, signal generating means responsive after a predetermined period following the initial storage of said reference velocity signal, for producing a generated signal corresponding to said initial reference velocity signal, said signal generating means initially decreasing the generated signal at a second predetermined rate of change of wheel speed greater than said first reference rate of wheel speed and for a variable period whose duration is a function of the initially stored reference velocity signal, said signal generating means then being responsive following said variable period to increase the generated signal at a third predetermined rate of change of wheel speed until it attains a predetermined value having a given relationship with the initially stored reference velocity signal, and said signal generating means then being further responsive following the attainment of said predetermined value by the generated signal to decrease the latter at a fourth predetermined rate of change of wheel speed, the control circuit further comprising comparative means responsive to said input signal to cause said operating means to terminate said output signal to cause solenoid de-energisation whenever said quantity assumes a value corresponding to a wheel speed having a given relationship with the prevailing value of the generated signal.

2. An electronic control circuit as claimed in claim 1, wherein said initial reference velocity signal corresponds substantially to the actual wheel speed that obtains when said output signal is produced.

3. An electronic control circuit as claimed in claim 1, wherein said predetermined value is the signal value that the initially stored reference velocity signal would have attained had the latter been decreasing at said first predetermined rate of change of wheel speed from its instant of storage.

4. An electronic control circuit as claimed in claim 1, wherein said fourth predetermined rate of change of wheel speed is substantially the same as said first predetermined rate of change of wheel speed.

5. An electronic control circuit as claimed in claim 1, wherein said output signal is terminated when said quantity assumes a value corresponding to a wheel speed which is substantially the same as the prevailing generated signal.

6. An electronic control circuit as claimed in claim 1, wherein the final decrease of the generated signal at said fourth predetermined rate of change of wheel speed is effected after a predetermined delay during which the generated signal is held at said predetermined value.

7. An electronic control circuit as claimed in claim 1, wherein said second predetermined rate of change of wheel speed is exponential.

8. An electronic control circuit as claimed in claim 1 wherein said third predetermined rate of change of wheel speed is substantially linear.

9. An electronic control circuit as claimed in claim 1 including timing means for automatically de-energising the solenoid after a preset time.

10. An electronic control circuit as claimed in claim 1 including means for inhibiting solenoid de-energisation until said quantity signifies that wheel acceleration has reached a predetermined value or the existing acceleration has fallen to a lower predetermined value.

11. An electronic control circuit as claimed in claim 1, wherein, following solenoid de-energisation due to said quantity assuming a value corresponding to a wheel speed having a given relationship with the prevailing generated signal, resetting is inhibited until the end of the increase of the generated signal at said third predetermined rate of change of wheel speed, whereby to allow a further period of solenoid energisation if said quantity again assumes such a value during the remainder of the stored reference velocity sequence.

12. An electronic control circuit as claimed in claim 1, adapted for response to an input signal derived from a train of pulses the frequency of which is proportional to the speed of rotation of a wheel to be controlled by an anti-lock brake system embodying the control circuit.

13. An electronic control circuit as claimed in claim 12, including means for producing from such train of pulses an input signal the amplitude of which varies with variation in wheel speed as a natural log. function together with means for producing wheel slip detection in response to such input signal.

14. An electronic control circuit as claimed in claim 12, including means for producing from such train of pulses an input signal the amplitude of which is proportional to wheel speed, together with means for producing wheel slip detection in response to such input signal.

* * * * *

UNITED STATES PATENT AND TRADEMARK OFFICE
CERTIFICATE OF CORRECTION

PATENT NO. : 3993363
DATED : November 23, 1976
INVENTOR(S) : DEREK ROBERT SKOYLES ET AL It is certified that error appears in the above-identified patent and that said Letters Patent are hereby corrected as shown below:

Column 1, line 14, "suuccessful" should be --successful--;

also delete "the".

line 37, "2" should be --1--.

Column 7, line 38, "66" should be --6--;

line 65, "inhibiited" should be --inhibited--.

Column 8, line 30, "4.0." should be --4.0g.--.

Signed and Sealed this

Thirty-first Day of May 1977

[SEAL]

Attest:

RUTH C. MASON
*Attesting Officer*

C. MARSHALL DANN
*Commissioner of Patents and Trademarks*